R. M. BAKER.
WAGON-BRAKE.

No. 186,447. Patented Jan. 23, 1877.

UNITED STATES PATENT OFFICE.

ROBERT M. BAKER, OF MARCELLUS, NEW YORK.

IMPROVEMENT IN WAGON-BRAKES.

Specification forming part of Letters Patent No. 186,447, dated January 23, 1877; application filed October 29, 1875.

*To all whom it may concern:*

Figure 1:
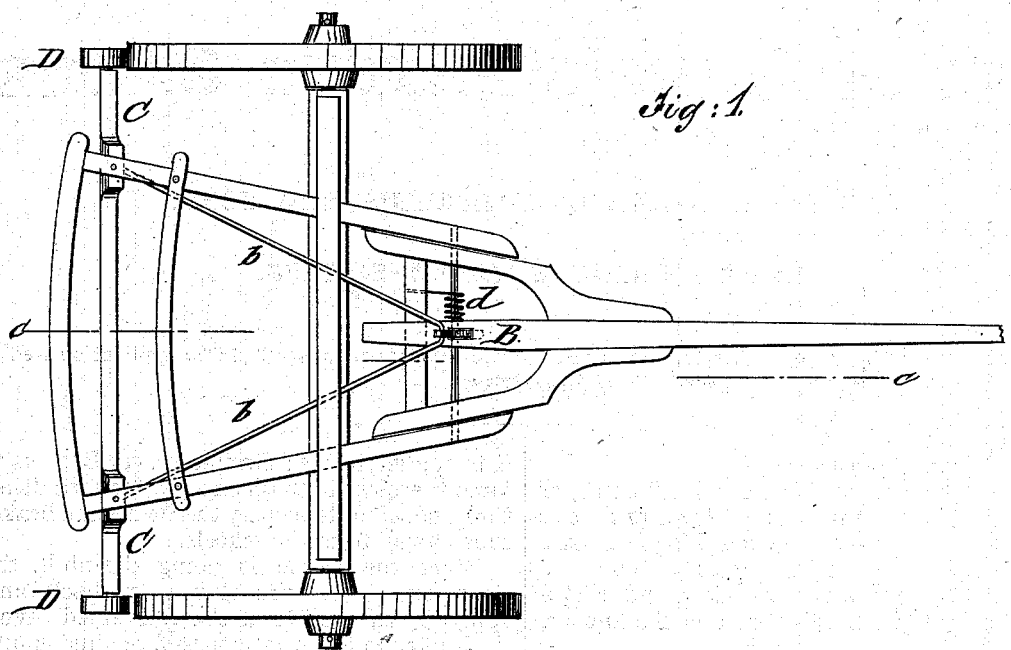
Figure 2:
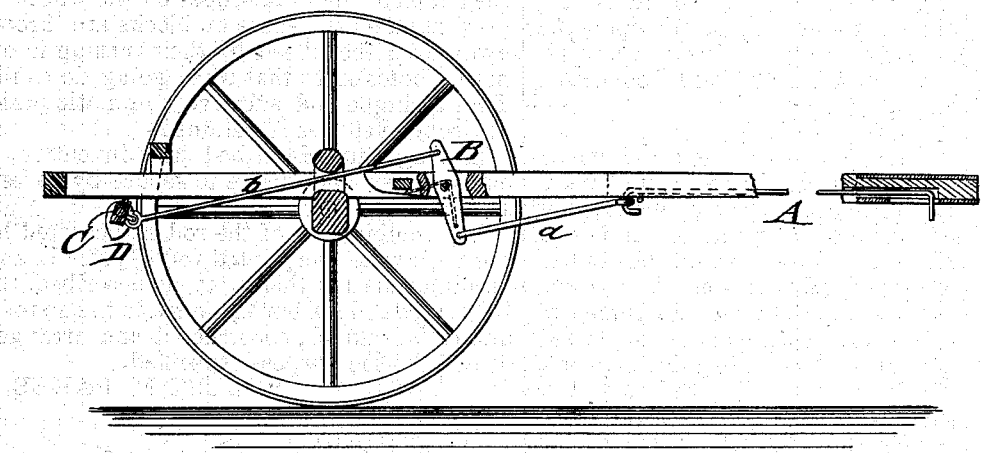

Be it known that I, ROBERT M. BAKER, of Marcellus, Onondaga county, New York, have invented a new and Improved Wagon-Brake, of which the following is a specification:

Figure 1 represents a top view, and Fig. 2 a vertical longitudinal section on the line $c\ c$, of my improved wagon-brake.

Similar letters of reference indicate corresponding parts.

The purpose of my invention is to furnish an automatic brake that shall be simple and cheap in construction and prompt in action, without producing a greater strain upon the parts than is necessary for the purpose required, and that is instantly freed from action in backing.

The construction is as follows:

In the drawing, A represents a rod, which slides in a longitudinal recess at the under side of the wagon-tongue, being connected at the front end to the neck-yokes of the horses or other animals. The rear end of the rod A connects, by a pivoted lever-rod, $a$, with the lower end of a lever, B, that is fulcrumed to the pivot of the wagon-tongue, and connected at the upper end by spreading lever-rods $b$, with the lateral brake-bar C. The brake-bar C is suspended by suitable straps or links from the fifth-wheel, and provided at the ends with brake-shoes D. A spiral or other spring, $d$, is applied to the fulcrumed lever B, so as to force thereby the tongue-rod in forward direction, and, simultaneously therewith, the brake-shoes away from the wheels.

When the wagon is going downhill, the neck-yokes carry the sliding rod back, and apply, by the action of the fulcrumed lever, the brakes to the wheels with force just equivalent to the action of the animals upon the neck-yoke, and releasing them as soon as on level ground, the strain of the neck-yokes is discontinued. When the wagon is backed, the action of the brake-shoes on the wheels is prevented, as the shoes or blocks are thrown away from the wheels by their turning in opposite direction to that when going downhill. Thus a simple and effective automatic brake device for vehicles is obtained.

Having thus described my invention, I claim as new and desire to secure by Letters Patent—

The combination of the rod A, actuated by the neck-yoke, the jointed rod $a$, lever B, and spring connected therewith, as described, the bifurcated rod $b\ b$, bar C, hinged to the hounds, and cam-brake D, constructed and arranged as and for the purposes specified.

ROBERT M. BAKER.

Witnesses:
 R. M. STONE,
 B. R. BAKER.